Feb. 20, 1968     JEAN-PAUL L. DREYFUS     3,369,480
EGG COOKER

Filed Jan. 18, 1965     2 Sheets-Sheet 1

INVENTOR.
Jean-Paul L. Dreyfus
BY *Walter S. Zebrowski*
ATTORNEY

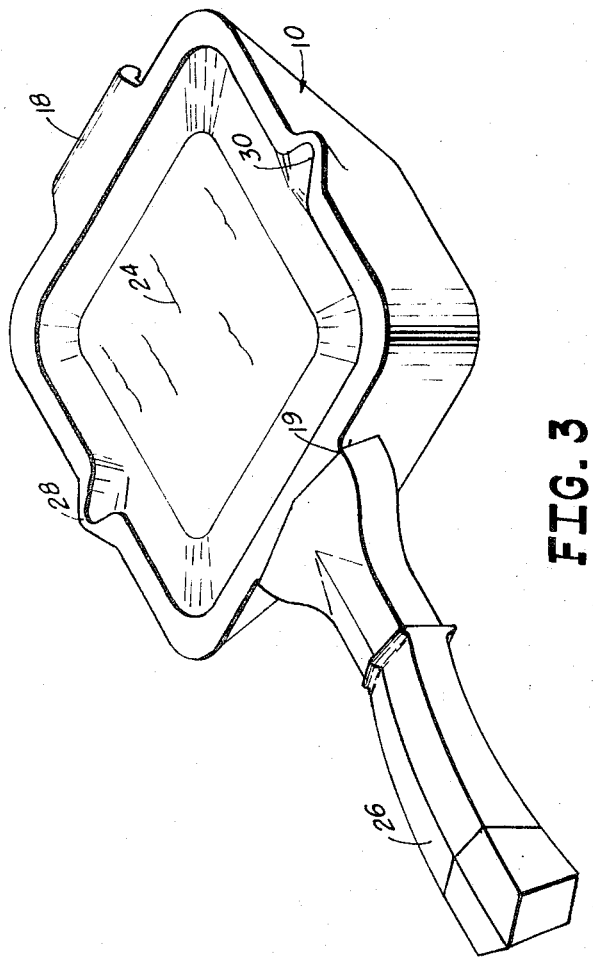

3,369,480
EGG COOKER
Jean-Paul L. Dreyfus, Rego Park, N.Y., assignor to Corning Glass Works, Corning, N.Y., a corporation of New York
Filed Jan. 18, 1965, Ser. No. 426,218
7 Claims. (Cl. 99—440)

This invention relates to egg cookers and more particularly to an improved egg cooking and serving vessel suitable for cooking and serving a single egg.

Pots, saucepans, skillets, double boilers and the like are commonly used for egg cooking. They are not at all suited for egg serving, and are inefficient for cooking single eggs.

Ordinary cups, bowls, plates, platters and the like are used for egg serving. They are not at all suited for egg cooking, and are only partly satisfactory for serving boiled eggs, for example.

Combined cooker-servers are known but are usually made of plastic and cannot be used on stove top heating elements because plastic warps, burns, melts and creates noxious fumes when exposed to excessive heat. In like manner, plastic is relatively insubstantial, being prone to cracking and breaking. With repeated use, plastic stains and retains cooking odors.

Egg cups, adapted for serving single eggs cannot successfully be employed for cooking eggs, nor do they have sufficient thermal mass to keep eggs warm during the waiting period between cooking and eating.

Accordingly, the present invention is directed to the solution of these and other problems.

An object of this invention is to provide a combination egg cooker and server suitable for containing a single egg.

Another object of this invention is to provide an egg cooker and server which may be used directly on the heating element of a stove.

Still another object of the present invention is to provide an egg cooker and server which is highly resistant to cracking or breaking.

A further object of this invention is to provide an egg cooker and server which does not readily stain or retain unpleasant odors.

A still further object of the present invention is to provide an egg server which can keep a cooked egg warm for extended periods of time.

Another object of this invention is to provide an egg cooker that is well suited to egg serving.

A further object of the present invention is to provide an egg server that is well suited for egg cooking.

These together with other objects and advantages of this invention will become apparent from the following attached description and drawings.

Briefly, the present invention embodies an egg cooker or cooking vessel and server combination comprising an internally tapered hollow body and a base having one flat surface and a surface opposite the flat surface defining a cavity suitable for accommodating one end of a chicken's egg. The base is integrally united with the body in such manner that the cavity and tapered internal surfaces thereof smoothly and continuously adjoin. The other end of the body is open and has a rim or edge within which a pouring lip is embodied.

FIGURE 3 is a perspective view of the present invention shown with a detachable handle, a pouring lip and holding water.

This egg cooker has a generally rectangular shape. Internally, the body of the egg cooker has steeply sloping sides which terminate in a shallow depression in the base, adapted to hold one end of a chicken's egg. All surfaces smoothly blend, edges and corners being smooth and rounded with few abrupt transitions.

The outside wall surfaces do not slope as steeply as the inside wall surfaces, thus creating a progressive thickness increase toward the base of the cooker. The open end of the body has an edge or rim and at least one pouring lip thereon.

Figure 1:
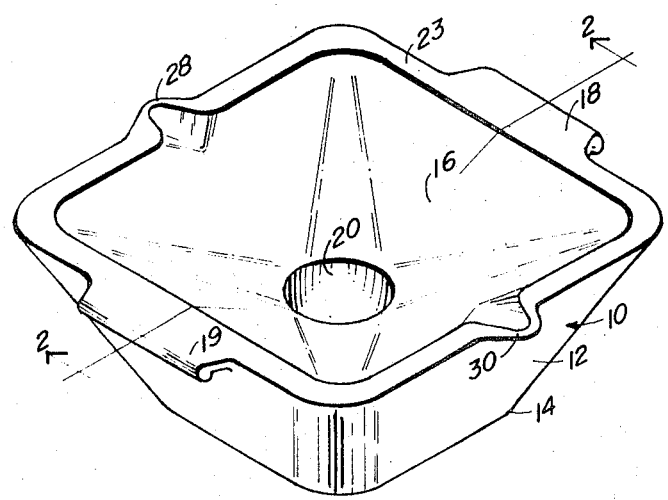
FIGURE 1 is a fragmentary perspective view of the present invention.
Figure 2:
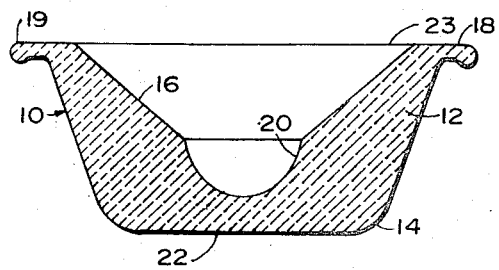
FIGURE 2 is a cross sectional view taken on line 2—2 of FIGURE 1 of this invention.

Referring now to the drawings, FIGURES 1 and 2 illustrate an egg cooker 10 having a hollow tapered body 12 and integral base 14.

The inner surface 16 of body 12 extends smoothly downward and inward from ear-like protrusions 18 and 19 to cavity 20 adapted to accommodate one end of a chicken's egg, not shown. Flat surface 22 of integral base 14 is suitable for supporting egg cooker 10 on tables, trays, stove tops, etc., not shown.

The interior of egg cooker 10 may be compared to an inverted cone whose apex is formed by cavity 20, and whose larger end is represented by the rim or edge 23 of body 12.

FIGURE 3 shows egg cooker 10 with ear-like protrusions 18 and 19 adapted for attachment of detachable handle 26. Also shown within egg cooker 10 is water 24, ready to receive an egg, not shown, for poaching. Pouring lips 28 and 30 are used for convenient decanting of water 24.

It is apparent that decanting water from this cooking and serving vessel is extremely simple, there being a smooth transition from upright to semi-inverted position, made possible by the steeply sloping interior walls.

The base of the cooker is relatively thick. Because of this it has a large thermal mass that keeps the egg warm for extended periods of time after removal of external heating means.

The detachable handle provides a convenient means for removing the vessel from stove top and carrying it, while hot, to the table whereafter the handle may be removed.

To boil an egg using the present invention, an egg is placed, large end first, into the cavity in the base of the cooker where it is firmly supported. Water is poured around the egg until the cooker is nearly full. It is obvious that the cooker contains only a small amount of water because of its conical interior shape. The water is brought to a boil and the egg is cooked, after which the water is poured out, leaving the egg in its shell ready for breaking open and eating.

A plurality of eggs may be cooked at one time by using a plurality of cookers side by side on a steam tray. In this case, no water need be added to an individual cooker, only to the tray. A cover is placed over the cookers and tray, and heat is applied, transforming water to steam. After a suitable time has passed, the heat is removed, the cover is lifted and the individual cookers may be taken from the tray, using the detachable handle as previously described.

To poach an egg using the present invention, water is first added to the cooker. A raw egg is dispensed into the water and the cooker is placed on the stove, steam tray or other heating device until the egg is cooked. In ordinary cookers a special draining spoon or strainer is required to remove the egg from the water. In the cooker of this invention, the water may be readily decanted without disturbing the egg, leaving it ready to eat.

Scrambled eggs or individual omelettes may be prepared by dispensing an appropriate quantity of a mixture of egg and other ingredients into the cooker. The mixture is then heated by any of the previously described methods until satisfactorily cooked. The cooked mixture is then conveniently scooped from the cooker, being kept warm during eating by the thermal mass of the cooker.

It is obvious that the cooker could be made from metals such as stainless steel or aluminum and from glass, glass-ceramic, or like materials.

For one example of a suitable glass-ceramic material, reference is made to U.S. Patent No. 2,920,971 issued to S. D. Stookey.

Although this invention has been described with respect to specific details of certain embodiments thereof, it is not intended that such details be limitations upon the scope of the invention except insofar as set forth in the following claims.

I claim:

1. An egg cooker comprising a massive, unitary body and base, said body being hollow and having an internal taper and said base having one flat surface and a surface opposite said flat surface defining a cavity suitable for accommodating one end of a chicken's egg shell, said base being integral with said body at the tapered end thereof so that the cavity and the internally tapered surfaces smoothly and continuously adjoin, the other end of said body being open.

2. The egg cooker of claim 1 made from glass.
3. The egg cooker of claim 1 made from metal.
4. The egg cooker of claim 1 made from ceramic.
5. The egg cooker of claim 1 made from glass-ceramic.
6. An egg cooker comprising a massive, unitary glass-ceramic body and base, said body being hollow and closed at one end by the integral base which has one flat surface and a surface opposite said flat surface defining a cavity suitable for accommodating one end of a chicken's egg shell, the other end of said body being open and terminated by a rim having a pouring lip in at least one portion thereof.

7. The egg cooker of claim 6 further comprising a protrusion extending horizontally outward from at least one portion of said rim, said protrusion being adapted for accommodating a detachable handle.

References Cited

UNITED STATES PATENTS

| D. 187,544 | 3/1960 | Murray | 99—440 X |
| 1,313,947 | 8/1919 | Lafferty | 99—440 |
| 3,186,026 | 6/1965 | Serio | 220—94 X |

FOREIGN PATENTS

| 968,429 | 4/1950 | France. |
| 1,116,310 | 1/1956 | France. |

WILLIAM I. PRICE, *Primary Examiner.*

S. P. FISHER, *Assistant Examiner.*